UNITED STATES PATENT OFFICE.

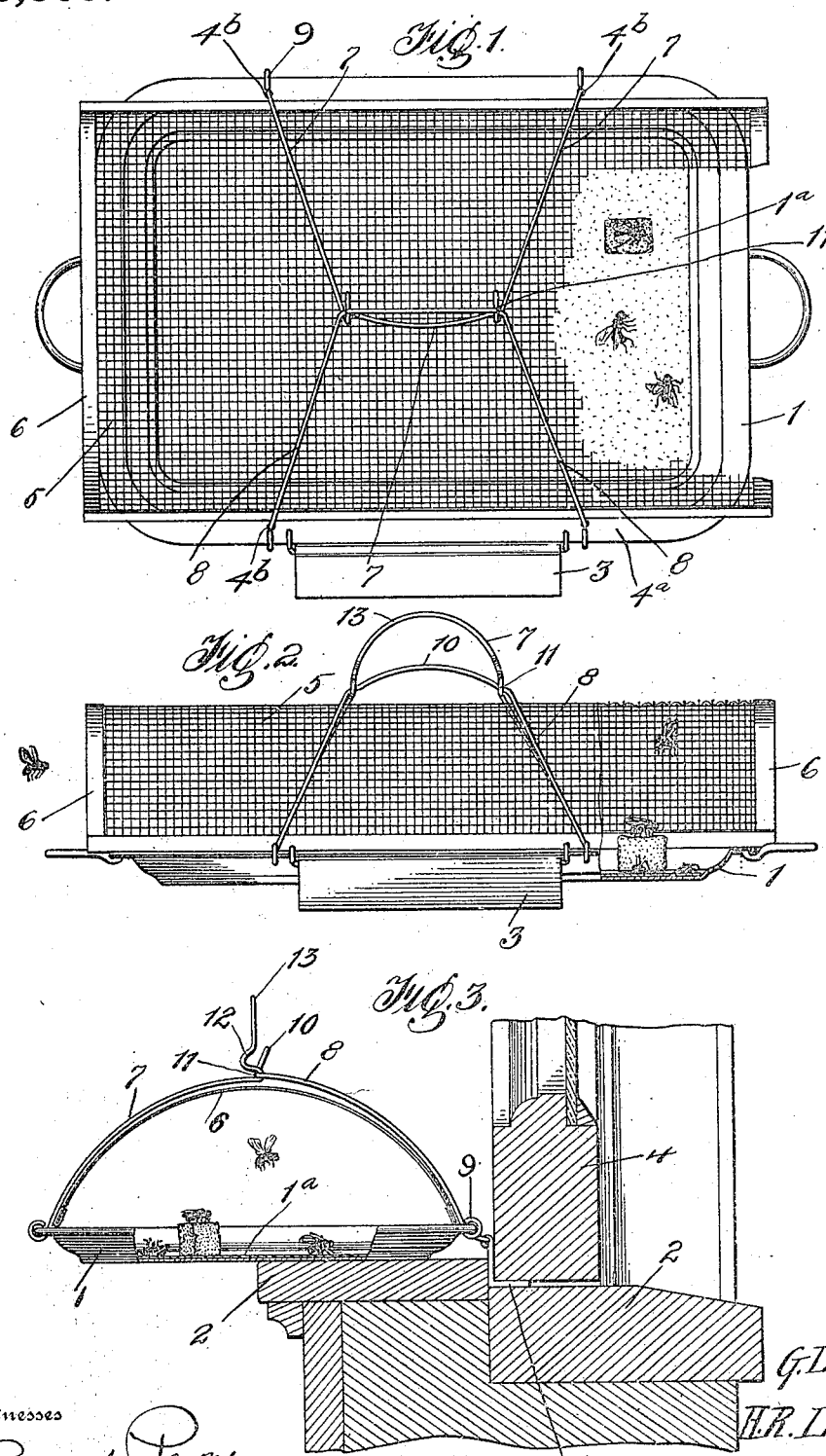

GODFRIED LAUBE AND HATTIE R. LAUBE, OF SANTA MONICA, CALIFORNIA; SAID GODFRIED LAUBE ASSIGNOR TO GEORGE N. BARTLETT, OF LOS ANGELES, CALIFORNIA.

FLY-TRAP.

948,863.  Specification of Letters Patent.  Patented Feb. 8, 1910.

Application filed March 6, 1909. Serial No. 481,696.

*To all whom it may concern:*

Be it known that we, GODFRIED LAUBE and HATTIE R. LAUBE, citizens of the United States of America, residing at Santa Monica, in the county of Los Angeles and State of California, have invented certain new and useful Improvements in Fly-Traps, of which the following is a specification, reference being had therein to the accompanying drawing.

This invention relates to fly traps in that class embodying a tray and a screen therefor and the object thereof is to provide means in a manner as hereinafter set forth for retaining the screen upon the tray, said retaining means providing a handle for conveniently removing the trap from place to place and further providing means for suspending of the trap.

With the foregoing and other objects in view the invention consists of the novel construction, combination and arrangement of parts hereinafter more specifically described and illustrated in the accompanying drawings, wherein is shown the preferred embodiment of the invention, but it is to be understood that changes, variations and modifications can be resorted to which come within the scope of the claim hereunto appended.

In the drawings wherein like reference characters denote corresponding parts throughout the several views: Figure 1 is a top plan view of a fly trap showing the screen retaining means in accordance with this invention, Fig. 2 is a side elevation partly in section, and Fig. 3 is an end view of the trap, showing the retaining means, the trap being mounted upon a window sill.

Referring to the drawings in detail 1 indicates the tray adapted to support a strip of fly paper $1^a$ which is provided with a suitable adhesive, as is well known.

When the trap is mounted upon a window sill 2, it is secured in position by a pivoted L-shaped holder 3 adapted to extend below and to be engaged by a window sash 4 whereby the trap is secured in position.

The tray 1 is provided with a laterally-extending continuous flange $4^a$ and each of the longitudinally-extending portions of the flange $4^a$ is formed with a pair of openings $4^b$ which are suitably spaced from each other, that is to say one is arranged at a point removed from a transverse line through the center of the tray. Mounted upon the tray 1 and of a length as to project from each end of the tray is an arch-shaped screen of wire mesh 5 having its side and end edges reinforced as at 6. To retain the screen 5 in position upon the tray 1 and to also enable conveniently shifting of the tray from point to point when desired, and further more to allow of the trap being suspended a pair of interengaging frames 7 and 8 are employed. Each of the frames 7 and 8 is substantially arch-shaped and each of said frames has the free ends thereof extending through the openings $4^b$ and then bent around to overlap the upper face of the flanges $4^a$ as at 9. The frame 8 has its upper end angularly disposed as at 10 and the frame 7 has the upper portion thereof bent upon itself to provide a seat 11 for the terminus of the angular upper end of the frame 8 whereby the upper ends of the frames will be detachably connected together. The frame 7 at its upper portion and above the seat 11 is bent in a curvilinear manner, as at 12, said curvilinear portion extending in an arch-shaped portion 13 which constitutes a handle for conveniently handling the trap when shifting it from point to point, or to allow of the trap being conveniently mounted upon a suspending device therefor.

What we claim is:

A means for securing a screen to the tray of a fly trap, said means comprising arch-shaped frames having the ends thereof extending through and overlapping the longitudinal portions of the frames, one of said frames having the upper end thereof angularly disposed with respect to the remaining portion of the frame, and the other of said frames provided at its upper end with a seat for the reception of the lower terminus of the angularly disposed portion of the first mentioned frame, that frame provided with a seat further more provided with a curvilinear portion above said seat and which terminates in a vertically-extending arch-shaped portion constituting a handle.

In testimony whereof we affix our signatures in the presence of two witnesses.

GODFRIED LAUBE.
HATTIE R. LAUBE.

Witnesses:
BLANCHARD OGDEN,
ALFRED STEERS.